United States Patent [19]

Furrow

[11] Patent Number: 5,423,418
[45] Date of Patent: Jun. 13, 1995

[54] CONVEYOR APPARATUS WITH SIDE RAIL GUARD

[76] Inventor: James F. Furrow, 8201 Havens Rd., Blacklick, Ohio 43004

[21] Appl. No.: 251,246

[22] Filed: May 31, 1994

[51] Int. Cl.$^6$ .............................................. B65G 21/02
[52] U.S. Cl. .............................. 198/860.3; 193/35 R; 198/780
[58] Field of Search ................... 198/780, 860.1, 860.3; 193/35 R

[56] References Cited

U.S. PATENT DOCUMENTS

| | | | |
|---|---|---|---|
| 2,593,089 | 4/1952 | Barry | 193/35 R |
| 3,726,376 | 4/1973 | Gotham et al. | 193/35 R |
| 3,888,343 | 6/1975 | Snyder | 198/780 |
| 4,056,180 | 11/1977 | Gunti | 193/35 R X |
| 4,366,894 | 1/1983 | Huelster | 193/35 R |
| 5,148,909 | 9/1992 | Becker et al. | 198/780 |

*Primary Examiner*—D. Glenn Dayoan
*Attorney, Agent, or Firm*—Francis T. Kremblas, Jr.

[57] ABSTRACT

A conveyor system of the type having rotatable members supported by a pair of side frame members having a rear wall and outwardly facing flanges forming a C-channel configuration and provided with a safety guard having a complimentary C-channel configuration mounted in frictional engagement to cover the exposed edges of the flanges and the channel of the side frame members. The safety guard includes an integral, molded resilient material having a rear wall and extending flanges which are normally disposed angled toward one another and slideably receive the flanges of the side member in a releasable friction fit relationship.

3 Claims, 1 Drawing Sheet

CONVEYOR APPARATUS WITH SIDE RAIL GUARD

TECHNICAL FIELD

The present invention relates generally to conveyor systems and particularly to the combination of a removably mounted guard member cooperatively mounted over exposed edges of a conventional side rail forming a portion of the supporting frame of a conveyor to protect workers from these exposed edges.

BACKGROUND ART

Conveyor systems of the type using gravity feed or motorized rollers to move cartons or other hard goods along a production or distribution line have been widely used throughout various industries for many decades. Such conveyor systems include a basic supporting frame which includes a pair of spaced side rails which support rotatable rollers upon which the goods are transported along a conveyor Line. These side rails, almost universally, are C-shaped metal channel members wherein the upper and lower flanges face outwardly to expose relatively sharp edges to personnel working on the sides of the conveyor. This construction represents an even greater a more acute problem where sections of the side rails are joined together and where the conveyor line is angled in a change of direction.

Personnel who load, remove or otherwise are working along the line of goods being transported on these conveyors are exposed to these sharp edges as they must stand facing the side rails and reach across to handle cartons, boxes or the like moving along the conveyor.

During performance of their duties, the workers' hands, bodies and clothing are continually exposed to incidental contact with these exposed edges of the side rails which often cause injury or torn clothing. Various prior art methods and means suggested to overcome this long standing problem have not been satisfactory or have been rejected as economically impractical. There has been a long felt need to provide a simple, inexpensive and easily adaptable solution to improve the safety factor for personnel working such conveyor systems which for many years has eluded those skilled in the art.

BRIEF DISCLOSURE OF INVENTION

The present invention relates to a safety guard for use in combination with a conventional side rail of a conveyor assembly. These side rails are of the type forming a C-channel, that is, having a rear wall provided with a pair of spaced, outwardly turned flanges whose exposed edges present a safety hazard to workers performing various duties in connection with the goods traveling along the conveyor.

The safety guard of the present invention comprises a molded plastic cover member which comprises a C-channel configuration complimentary to the configuration of the conveyor side rail and has an outwardly disposed wall and a pair of spaced inwardly directed flanges which are adapted to frictionally slide over the outwardly extending flanges of the conveyor side rail. The outer ends of the flanges of the safety guard are provided with means to releasably grip or lock the safety guard over the conveyor flanges to prevent inadvertent dislodgement of the guard without hampering relatively simple and facile installment of the guard onto an existing side rail of a conveyor assembly.

DETAILED DESCRIPTION

Figure 1:
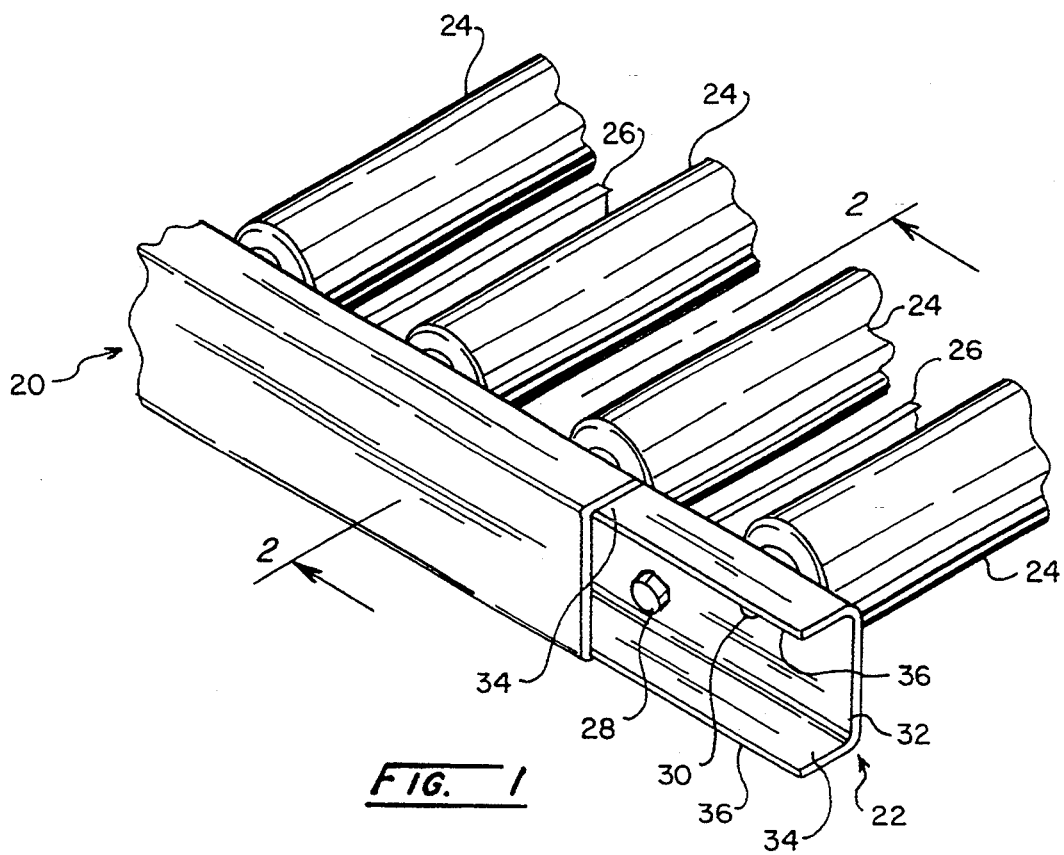
FIG. 1 is a perspective view of a portion of a conventional conveyor assembly illustrating the cooperative relationship between the safety guard and the side rail of the frame supporting the conveyor assembly.

A conveyor safety guard assembly constructed in accordance with the present invention is illustrated in FIG. 1 and includes a guard portion, indicated generally at 20, which is adapted to removably engage the side rail 22 which forms a part of the supporting frame of a conventional conveyor assembly which typically includes rotatably mounted rollers or the like 24.

The remaining portions of the conveyor assembly are not shown, as such assemblies are conventional and well-known to those skilled in the art and the details are not necessary for one Of ordinary skill in the art to understand the present invention.

It should be noted that such conventional conveyor assemblies can include rollers which are motor driven or freely rotatable depending upon the design requirements of a given conveyor system application. Further, other well-known forms of a rotatable surfaces upon which the goods can be similarly conveyed are deemed equivalent in operation by those skilled in the art for purposes of the present invention.

Lateral support members 26 are conventionally connected by a bolt and nut such as at 28, to a spaced pair of side rails 22 and form a part of the general supporting frame, not shown. The opposing side rail 22 is not shown, however, it is identical to side rail 22 shown in FIGS. 1 and 2.

Each roller 24 is mounted for rotation about a shaft 30 in a conventional manner so that cartons, boxes, crates or the like, can be moved from one roller 24 to another along the path of the conveyor system in a well-known manner.

Figure 2:
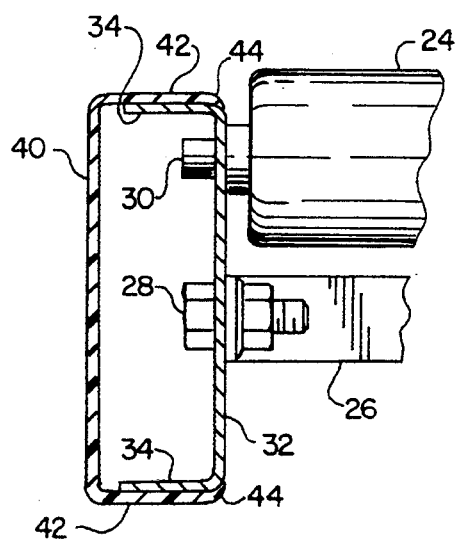
FIG. 2 is a side elevational view, in section, of the portion of the assembly shown in FIG. 1.

As best seen in FIGS. 1 and 2, each side rail 22 conventionally is formed in a C-channel configuration with a rear wall 32 and outwardly turned flanges 34. For purposes of description, part of the side rail 22 is uncovered by guard 20 so that the relatively sharp edges 36 of flanges 34 are shown in an exposed condition such as exists in the present conventional setting of such conveyor assemblies. Particularly in the many pre-existing conveyor constructions, these edges 36 are not deburred to any significant extent and are relatively in rough cut condition.

These edges 36 and to a lesser extent, the bolt head 28 and end of shaft 30, represent a safety hazard to personnel working along the line of the conveyor assembly.

These hazards are increased at any joint formed in the installation of the conveyor assembly where sections of a given length of the side rails 22 abut one another in conventional fashion. This problem is compounded where such joints are angled relative to one another to form a change of direction of the line of travel along the conveyor assembly.

Guard portion 20 of the present invention comprises a generally C-shaped channel of preferably a high impact plastic material which is complementary in size to side rail 22. Guard portion 20 includes a wall portion 40 and vertically spaced flanges 42.

Each flange 42 is preferably angles slightly toward one another and provided with a turned or radiused end 44 such that the inherent resiliency of the plastic material forming guard portion 20 permits the flanges 42 to slide over flanges 34 of side rail 22 in an interference or friction fit with the curved ends 44 disposed in force-transmitting engagement over the curved joinder of rear wall 32 and flanges 34 of side rail 22. In this disposition, guard portion 20 is firmly, but removably, attached to side rail 22 and completely covers the sharp edges 36 of flanges 34 and the associated hardware such as bolt head 28 and the end of shaft 30 which protrude through rear wall 32 of side rail 22.

Therefore, personnel who are working the conveyor assembly and make frequent contact with the side rail 22 are not exposed to the edges 36 and other protrusions commonly associated With conventionally made side rails 22 and a safer work,environment is afforded after the installation of guard portion 20.

Figure 3:
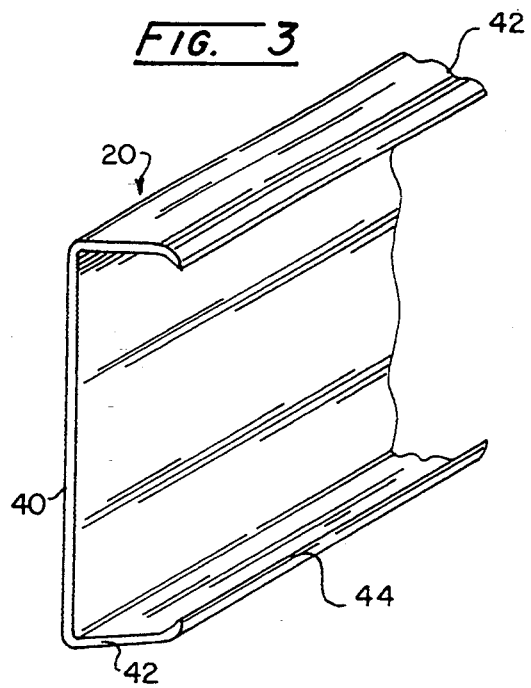
FIG. 3 is a perspective view of a portion of the safety guard shown in the preceding figures, the guard being illustrated removed from the side rail of the conveyor assembly.
Figure 4:
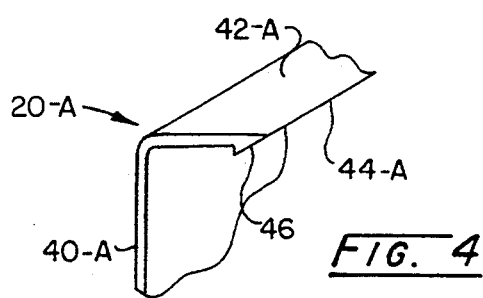
FIG. 4 is a partial perspective view of another embodiment of the safety guard shown removed from the side rail and illustrating a different construction for releasably locking the guard over the conveyor side rail.

With reference to FIG. 4, another embodiment of the present invention is illustrated wherein guard portion 20-A is essentially identical to the guard portion 20 shown and described in FIGS. 1-3 except for the outer edge portion 44-A of flange 42-A. Instead of a curved edge 44, the bottom surface of edge 44-A is provided with a lip 46 which can extend over the curved joint between flanges 34 and wall 32 of side rail 22.

Alternately, a series of small metal buttons or the like, not shown, can be welded in spaced relationship along the top surface of flanges 34. In this case, the outer edge of flange 42-A would not extend beyond the joint between flange 34 and wall 32 of side rail 22 and merely extend beyond the buttons or protrusions referred to above, such that the vertical trailing edge of lip 46 would engage the buttons and tend to make inadvertent removal of guard portion 20-A from side rail 22 more difficult. The ramp or angled forward edge of lip 46 makes sliding of the flanges 44-A over the flange 34 relatively easier when mounting guard portion 20-A over the flange 44-A.

Similarly to guard portion 20 shown and described in FIGS. 1-3, the thickness of flanges 42-A and the type of plastic material provide an inherent resiliency such that forming flanges 42-A so that they are slightly less than a right angle relative to wall 40-A and angled toward one another, provides an interference fit with flanges 34 of side rail 22 to further provide reliable and releasable engagement between these portions for purposes of the present invention.

Guard portions 20 or 20-A can be readily made to properly fit any size of a side rail, such as 22, of a given conventional conveyor system and in any convenient length for installation purposes.

Properly mounting guard portion 20 upon side rail 22 is easily accomplished by merely placing the upper flange 42 over the upper flange 34 of said rail 22. Then one merely pulls downwardly on the lower flange 42 or otherwise spreads flanges 42 apart sufficiently to slide them over each of the flanges 34 on side rail 22. Then merely pushing wall 40 toward side rail 22 slides flanges 42 over the flanges 34 until the curved edges 44 move over the curved joinder of flange 34 and wall 32 of side rail 22. Guard 20 is then mounted in an operative position.

While inadvertent dislodgement of guard portion 20 during normal conditions is unlikely, guard portion 20 can be relatively easily removed by manually lifting one of the flanges 42 upwardly to free the radiused edge 44 from engagement with the joinder of flange 34 and wall 32. Then guard portion can be simply pulled away from side rail 22 to slide the flanges 42 free with relative ease.

In view of the foregoing description, it should be readily understood that the combination of the guard portion 20 and the side rails 22 as described herein provides a safer work environment in a relatively inexpensive, easy to;install manner which solves a long standing problem of such conveyor systems.

I claim:

1. A conveyor side rail safety system comprising in combination;

a conveyor frame for supporting a plurality of spaced shafts for rotatably mounting elements defining a conveyor surface, said frame including a pair of side members connected to one another in laterally spaced fixed relationship and extending longitudinally along the direction of travel of goods placed on said conveyor surface, each of said side members including a wall provided with outwardly extending, vertically spaced flanges defining a longitudinally extending channel having an opening facing outwardly relative to said conveyor surface, an end of each of said shafts being supported in a respective one of said walls and extending outwardly into a respective one of said channels; and a guard member including a rear wall and resilient upper and lower flanges extending away from said rear wall, a respective one of said flanges of said guard member mounted over a respective one of said spaced flanges on at least one of the side members in a friction fit relationship disposing said rear wall of said guard member in overlying relationship to the opening of the channel formed between the flanges on said side member.

2. The system defined in claim 1 wherein said flanges and said wall of a respective one of said side members joining to form a radiused edge and the terminal edges of said flanges of said guard members are curved toward one another and are disposed in overlying frictional engagement with a respective one of the radiused edges joining said flanges and the wall of said side members.

3. The system defined in claim 1 wherein each of said flanges of said guard member include a terminal edge provided with a protrusion extending toward the opposing flange and resiliently biased to engage a respective one of said side rails to inhibit inadvertent dislodgement of said flanges of said guard member from the flanges of said side members.

* * * * *